(No Model.)
C. E. SCRIBNER.
TEST CIRCUIT FOR MULTIPLE SWITCH BOARDS.
No. 433,047. Patented July 29, 1890.
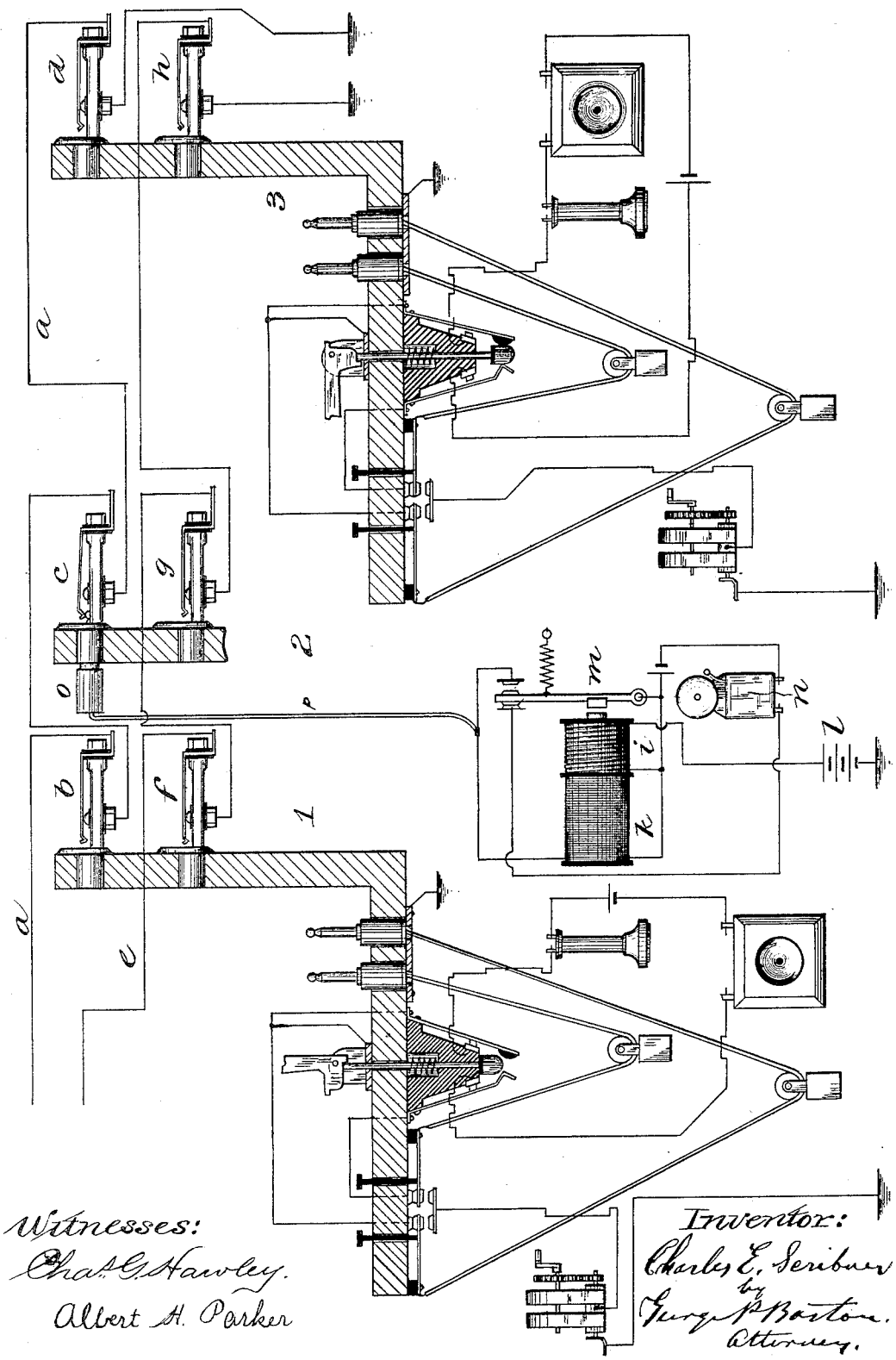
Witnesses:
Chas. G. Hawley.
Albert H. Parker.
Inventor:
Charles E. Scribner
by
George P. Barton.
Attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TEST-CIRCUIT FOR MULTIPLE SWITCH-BOARDS.

SPECIFICATION forming part of Letters Patent No. 433,047, dated July 29, 1890.

Application filed June 6, 1888. Serial No. 276,210. (No model.)

*To all whom it may concern:*

Be it known that I, CHARLES E. SCRIBNER, a citizen of the United States, residing at Chicago, in the county of Cook and State of Illinois, have invented a certain new and useful Improvement in Test-Circuits for Multiple Switch-Boards, (Case 160,) of which the following is a full, clear, concise, and exact description, reference being had to the accompanying drawing, forming a part of this specification.

My invention relates to testing apparatus for multiple switch-boards, and its object is to provide ready means of determining at one switch-board whether a line wanted or called for is connected or in use at any other of the boards.

In my patent, No. 385,205, granted June 26, 1888, I have shown a testing system which is in some respects similar to the system herein described. In said patent I have shown an apparatus for testing lines in both directions, the circuits being so arranged that the resistance of the clearing-out annunciators under certain conditions will be removed from the circuit when the test is made.

My invention herein relates more especially to the system of telephone exchange in which the signals between the subscribers and the operators at the central office are transmitted over independent wires, one of these independent wires being common to several subscribers' stations. This system is known generally as the "Firman system" or the "Law system." In the Firman system no individual annunciators are required in the telephone-lines and no clearing-out annunciators are required in the connecting-cords. My invention, therefore, as claimed in my said application filed December 27, 1886, is not adapted for use in telephone-exchanges in which the connection between subscribers and operators is carried on over independent circuits.

My invention herein will be readily understood by reference to the accompanying drawing, in which I have shown two telephone-lines connected with switches on each of three multiple switch-boards and directly to the ground, the connecting apparatus being shown at two of the boards and the testing apparatus at one board only.

Telephone-line $a$ extends through spring-jack switches $b\ c\ d$ upon the different boards and to ground. In like manner telephone-line $e$ extends through switches $f\ g\ h$ on the different boards and from contact of the switch of the last board to ground. I have not deemed it necessary to show the independent circuits for the signaling between the operators at the central office and the subscribers, such circuits and the apparatus connected therewith being well known in the art.

The key-board apparatus of the boards 1 and 3 is of well-known construction and arrangement, and therefore needs no detailed description.

In connection with board 2, I have shown a testing apparatus. Such a testing apparatus, it will be understood, is used at each of the boards. The electro-magnet is provided with two windings, the winding $i$ being of coarse wire of, say, one-half an ohm resistance, and the winding $k$ being of fine wire, say, of fifty ohms resistance. The battery $l$ may consist of three or four cells included in a circuit of said electro-magnet. The armature-lever $m$ of the electro-magnet is included in a shunt around the fine-wire winding $k$. The winding $i$ is of such low resistance that the current from battery $l$, when sent to line or through any considerable resistance, will not be sufficient to magnetize the electro-magnet sufficiently to move the armature $m$ away from its back contact-point, so as to open the shunt around the high resistance $k$. If, however, current is sent from battery $l$ through the low-resistance winding directly to ground the electro-magnet will be of sufficient strength to attract its armature and move the armature-lever $m$ away from its back contact, so as to open the shunt around the high-resistance winding $k$. When the shunt is thus opened, and the two windings $i\ k$ are brought into circuit, battery $l$ will be sufficient to magnetize the electro-magnet sufficiently to cause it to retain its armature, though the circuit may be closed through considerable resistance—as, for example, the resistance of the line from the central office to the subscriber's station. I preferably include a buzzer $n$ in a local circuit with the armature-lever $m$ in such manner that when the armature is drawn to the poles of the electro-magnet this local circuit will be closed and cause the buzzer to vibrate. The plug $o$ of the testing apparatus is provided with a metallic tip, and is connected with a single flexible conductor $p$.

We will suppose now that line $a$ is called for at board 2, and the operator at board 2 desires to first test the line to find out if it is connected at switch $b$ and $d$ with another line. The act of testing consists simply in inserting the plug $o$ into the switch $c$ of the line, as shown, and listening to the buzzer $n$. If the line $a$ is closed directly to ground from switch $d$, as shown, it is evident that as the tip of the plug $o$ first touches the spring of switch $c$, and before said switch is lifted from its contact, current from battery $l$ will be sent through low-resistance winding $i$ directly to ground through switch $d$, thus opening the shunt around winding $k$; plug $o$ being inserted further lifts the spring of switch $c$, thus opening the ground portion of line $a$ at the central office, as shown. Battery $l$ will then be closed through winding $i$ and also through high resistance $k$ and thence through the line $a$ to subscriber's station upon line $a$. This resistance of line $a$ will not be so high but that the current from battery $l$ will be sufficient to magnetize the electro-magnet and thus retain the armature $m$ in the position shown, so that the buzzer will respond. The vibration of buzzer $n$ will indicate that the line is free. Suppose, however, that line $a$ is connected with another line at switch $d$, the circuit then which would be closed when the tip of plug $o$ should touch the spring of switch $c$ would be of so high resistance that battery $l$ closed through low-resistance winding $i$, and the resistance of the connected line, would not be sufficient to magnetize the electro-magnet so as to move the armature $m$. Thus the bell or buzzer $n$ would not respond. On inserting the plug $o$ further into the switch $c$, the direct ground is opened and we have included in the circuit of battery $l$ the resistance of the line $a$ from switch $c$ to the subscriber's station. This resistance of the circuit of battery $l$, through low-resistance winding $i$ would be so great that the electro-magnet would not draw the armature $m$ to its poles. Thus if the line tested were in use at switch $d$ or any other switch between switch $c$ and ground, buzzer $n$ would not respond. Suppose, however, a connection were made with line $a$ at switch $b$ of board 1, the line $a$ would be open at switch $b$ but closed directly to ground, as shown, through switch $d$. Under these conditions the tip of plug $o$ as it was thrust into switch $c$ would for an instant close the circuit of battery $l$ directly to ground. This closing of the circuit is however immediately followed by a complete break when the spring of switch $c$ is lifted from its contact by the insertion of the plug. The interval between the closing of the circuit and the break would be so short that the bell $n$ would not vibrate. One observing the armature $m$ at this time would see a slight motion. It would start toward its front contact, but would immediately fly back without having closed the circuit of the vibrating bell or buzzer $n$. It will thus be seen that by my apparatus the line is tested in two directions: first, toward the ground at the central station, and next, over the line to the subscriber's station. If the line is not connected at a switch toward the office ground no direct ground connection will be found, and therefore the armature $m$ will not move. If, however, a connection with the line has been made at a switch in the opposite direction, as at switch $b$, the direct ground circuit which is closed will remain closed for so short an interval of time that the circuit will not be closed through the buzzer $n$.

The testing apparatus shown at board 2, while described as a part of the multiple switch-board system and especially designed for testing, is in itself a complete mechanism, and may be used for any purpose for which it may be adapted. The switching device forming a part of this testing apparatus consists of the flexible cord $p$ and the plug $o$. It is evident that other connecting devices might be used in place of the flexible cord and plug.

The principal feature of this testing apparatus is the electro-magnet provided with two coils, one coil having but a small number of convolutions, and the other, speaking relatively, a large number of convolutions, the coil of the larger number of convolutions being normally shunted or short-circuited by the armature-lever of the electro-magnet when the battery-circuit through the electro-magnet is open. For convenience, a buzzer $n$ and a battery are included in a local-circuit with the armature when the armature is closed upon its front contact or stop. This buzzer may, however, be dispensed with, as the user might, by looking directly at the armature-lever $m$ or by noting the sound when the lever is closed against its front stop, determine the condition of the circuit tested.

Having thus described my invention, I claim as new and desire to secure by Letters Patent—

1. A testing apparatus consisting of a battery $l$ and an electro-magnet provided with two windings, one of a small number of convolutions and the other of a large number of convolutions included in a ground circuit, a shunt around the high-resistance coil, including the armature-lever and the flexible cord and terminal plug of said circuit, substantially as and for the purpose specified.

2. The combination, with multiple switchboards and telephone-lines connected each with a different switch on each of the boards and from the switch on the last board directly to ground, of testing apparatus at each of the switch-boards, said testing apparatus consisting of a normally-open ground circuit terminating in a movable connecting device, a battery included in said circuit with two coils of an electro-magnet, one of said coils having a small number of convolutions and the other a large number of convolutions, and the armature-lever of said electro-magnet included in a shunt normally closed around the coil having the greater number of convolutions, whereby it may be determined at any board whether a line wanted or called for is connected or in use at any other of the boards.

3. The combination, with multiple switchboards and telephone-lines connected each with a different switch on each of the boards and from the switch on the last board directly to ground, of testing apparatus consisting of a normally open ground circuit including a battery and two windings of an electro-magnet, said windings being the one of low resistance—say one-half an ohm—and the other winding of high resistance—say fifty ohms—the armature of said electro-magnet in a shunt which normally short-circuits the high-resistance winding, a local circuit including a battery and bell or buzzer $n$, including the armature-lever and the front stop of said lever, whereby a test may be made at any board to determine whether a line wanted is in use or connected at any other of the boards.

In witness whereof I hereunto subscribe my name this 23d day of May, A. D. 1888.

CHARLES E. SCRIBNER.

Witnesses:
GEORGE P. BARTON,
CHAS. C. WOODWORTH.